US011693653B2

(12) United States Patent
Hori et al.

(10) Patent No.: US 11,693,653 B2
(45) Date of Patent: Jul. 4, 2023

(54) SOFTWARE ANALYSIS SUPPORT SYSTEM AND COMPUTER PROGRAM THEREFOR

(71) Applicant: Hitachi, Ltd., Tokyo (JP)

(72) Inventors: Akihiro Hori, Tokyo (JP); Masumi Kawakami, Tokyo (JP); Makoto Ichii, Tokyo (JP); Yasufumi Suzuki, Tokyo (JP); Noboru Wakabayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/594,859

(22) PCT Filed: Apr. 13, 2020

(86) PCT No.: PCT/JP2020/016323
§ 371 (c)(1),
(2) Date: Nov. 1, 2021

(87) PCT Pub. No.: WO2020/226027
PCT Pub. Date: Nov. 12, 2020

(65) Prior Publication Data
US 2022/0308864 A1    Sep. 29, 2022

(30) Foreign Application Priority Data
May 9, 2019    (JP) .................................. 2019-089035

(51) Int. Cl.
*G06F 9/44*    (2018.01)
*G06F 8/75*    (2018.01)
*G06T 15/10*   (2011.01)

(52) U.S. Cl.
CPC ................ *G06F 8/75* (2013.01); *G06T 15/10* (2013.01)

(58) Field of Classification Search
None
See application file for complete search history.

(56) References Cited

U.S. PATENT DOCUMENTS 8,065,658 B1 * 11/2011 Bali .......................... G06F 8/70
717/113
8,065,685 B2    11/2011 Cermak et al.
(Continued)

FOREIGN PATENT DOCUMENTS

JP    5-307474 A    11/1993
JP    2004-5649 A    1/2004
(Continued)

OTHER PUBLICATIONS

International Search Report (PCT/ISA/210) issued in PCT Application No. PCT/JP2020/016323 dated Jun. 30, 2020 with English translation (six (6) pages).
(Continued)

*Primary Examiner* — Anna C Deng
(74) *Attorney, Agent, or Firm* — Crowell & Moring LLP

(57) ABSTRACT

Provided is a system that enables a user to easily analyze software. A software analysis support system 1 that supports analysis of a structure of software includes at least one computer. The computer acquires software component information 12 indicating a relationship and an attribute of each software component, acquires display element setting information 13 in which a first display element 41 corresponding to an attribute of each software component and a second display element 42 corresponding to a relationship between the respective software components are set, the display element setting information 13 being editable, and arranges each of the first display element and the second display element at a predetermined position of a virtual space 40 that displays the relationship of each software component on the basis of a plurality of predetermined attributes selected in advance among attributes of each software component.

9 Claims, 14 Drawing Sheets

(56) References Cited

U.S. PATENT DOCUMENTS

| | | | | |
|---|---|---|---|---|
| 10,768,421 | B1* | 9/2020 | Rosenberg | G02B 27/0172 |
| 2003/0214517 | A1* | 11/2003 | Gossweiler, III | G06T 11/206 |
| | | | | 345/629 |
| 2015/0261525 | A1* | 9/2015 | Kwon | G06F 8/71 |
| | | | | 717/121 |
| 2017/0092008 | A1* | 3/2017 | Djorgovski | G06T 15/205 |
| 2017/0109933 | A1 | 4/2017 | Voorhees et al. | |

FOREIGN PATENT DOCUMENTS

| | | |
|---|---|---|
| JP | 2013-152576 A | 8/2013 |
| JP | 2018-533099 A | 11/2018 |

OTHER PUBLICATIONS

German-language Written Opinion (PCT/ISA/237) issued in PCT Application No. PCT/JP2020/016323 dated Jun. 30, 2020 (four (4) pages).

Chinese Office Action dated Apr. 27, 2023 with partial English translation (12 pages).

* cited by examiner

FIG. 3

INDIVIDUAL SOFTWARE COMPONENT INFORMATION 121 (1210)

| SOFTWARE COMPONENT NUMBER (1211) | NUMBER OF ROWS (1212) | LAST UPDATE DATE AND TIME (1213) | LAST UPDATER (1214) | DIRECTORY STRUCTURE (1215) | HIERARCHY (1216) | COMPLEXITY (1217) | ... (1218) |
|---|---|---|---|---|---|---|---|
| 101 | 90 | 2019/04/01 12:00:01 | Taro Yamada | src/G1/L1/mod1/func1.c | DRIVER | 30 | ... |
| 102 | 40 | 2019/03/01 09:30:00 | Hanako Sato | src/G2/L2/mod3/func4.c | MIDDLE | 40 | ... |
| ... | ... | ... | ... | ... | ... | ... | ... |

FIG. 4

SOFTWARE COMPONENT RELATIONSHIP INFORMATION 122

| CALL RELATIONSHIP NUMBER 1221 | CALLER SOFTWARE COMPONENT NUMBER 1222 | CALLEE SOFTWARE COMPONENT NUMBER 1223 | NUMBER OF CALLS 1224 | SAME MODULE CALL 1225 | 1226 |
|---|---|---|---|---|---|
| 1 | 101 | 102 | 3 | True | ... |
| 2 | 102 | 103 | 1 | False | ... |
| ... | ... | ... | ... | ... | ... |

MAPPING SETTING 13(1)

| DRAWING OBJECT NAME (131) | ATTRIBUTE (132) | ATTRIBUTE OF CORRESPONDING SOFTWARE COMPONENT (133) | ASSOCIATION METHOD (134) |
|---|---|---|---|
| POINT | MAIN BODY | SOFTWARE COMPONENT NUMBER | ONE SOFTWARE COMPONENT IS REPRESENTED BY ONE POINT |
| POINT | COLOR | LAST UPDATE DATE AND TIME | COLOR IS CHANGED ACCORDING TO ELAPSED TIME |
| POINT | SHAPE | COMPLEXITY | SHAPE IS CHANGED ACCORDING TO COMPLEXITY |
| POINT | SIZE | NUMBER OF ROWS | SIZE OF POINT IS CHANGED ACCORDING TO NUMBER OF ROWS |
| POINT | θ COORDINATE | DIRECTORY STRUCTURE | θ COORDINATE IS CHANGED ACCORDING TO DIRECTORY STRUCTURE |
| POINT | Z COORDINATE | HIERARCHY | Z COORDINATE IS CHANGED ACCORDING TO HIERARCHY |

*FIG. 6*

MAPPING SETTING 13(2)

| DRAWING OBJECT NAME 131 | ATTRIBUTE 132 | ATTRIBUTE OF CORRESPONDING SOFTWARE COMPONENT 133 | ASSOCIATION METHOD 134 |
|---|---|---|---|
| LINE | MAIN BODY | CALL RELATIONSHIP NUMBER | ONE CALL RELATIONSHIP NUMBER IS REPRESENTED BY ONE LINE |
| LINE | START POINT | CALLER SOFTWARE COMPONENT NUMBER | CALLER SOFTWARE COMPONENT BECOMES START POINT |
| LINE | END POINT | CALLEE SOFTWARE COMPONENT NUMBER | CALLEE SOFTWARE COMPONENT NUMBER BECOMES END POINT |
| LINE | THICKNESS | NUMBER OF CALLS | THICKNESS OF LINE IS CHANGED ACCORDING TO NUMBER OF CALLS |
| LINE | COLOR | SAME MODULE CALL | COLOR OF LINE IS CHANGED ACCORDING TO PRESENCE OR ABSENCE OF SAME MODULE CALL |
| ... | ... | ... | ... |

FIG. 9
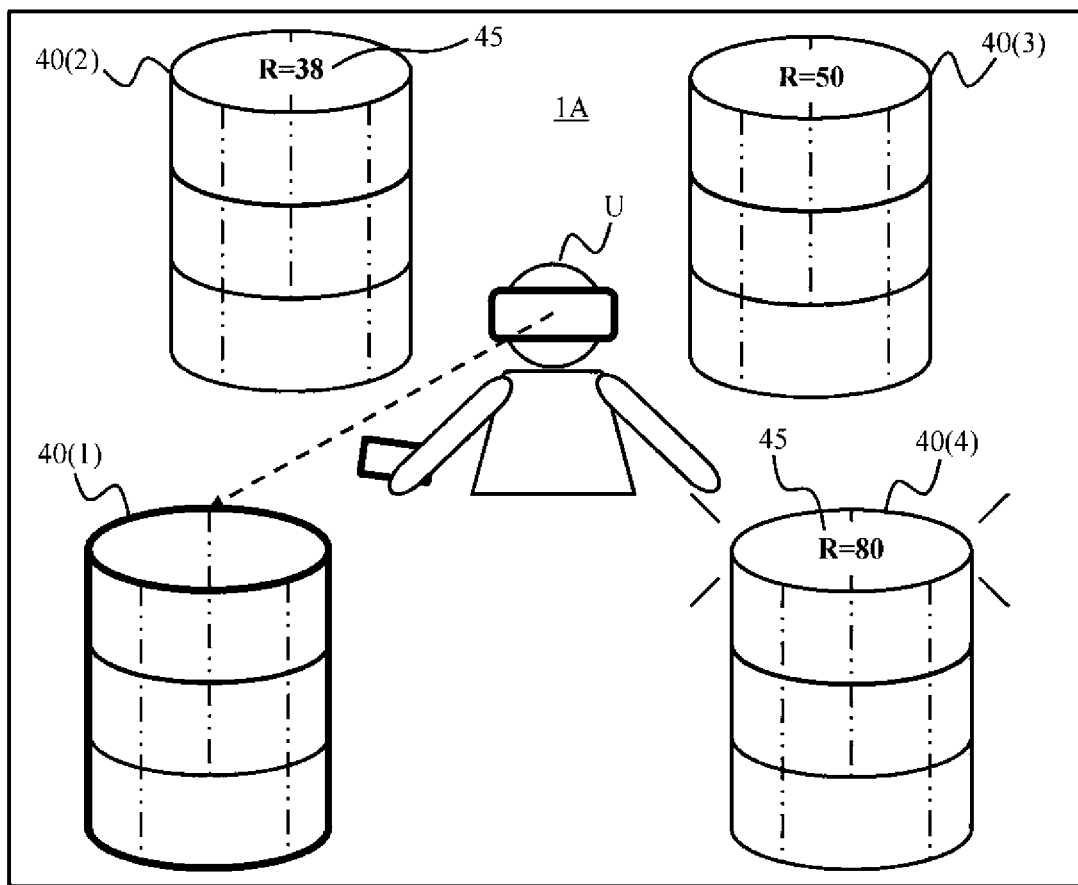
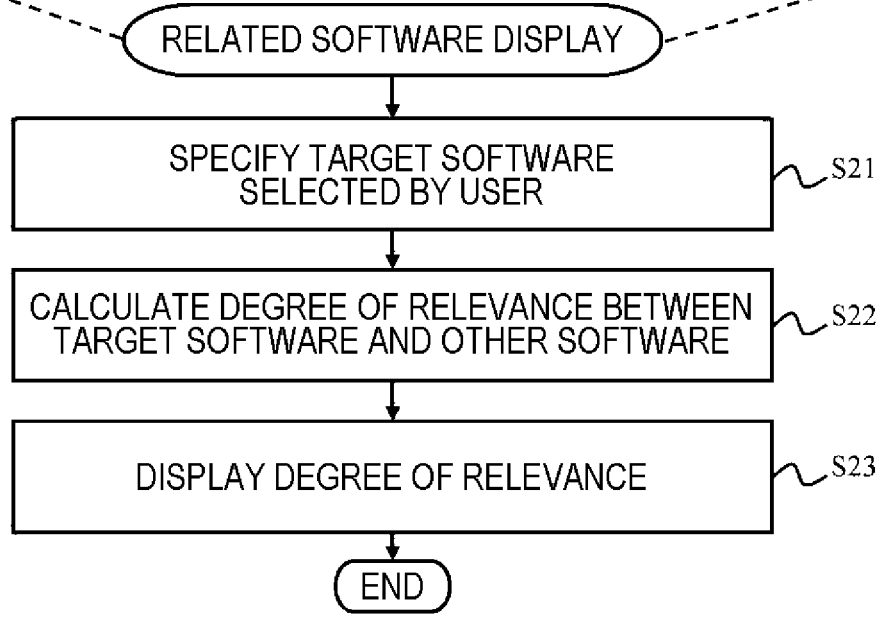

FIG. 14
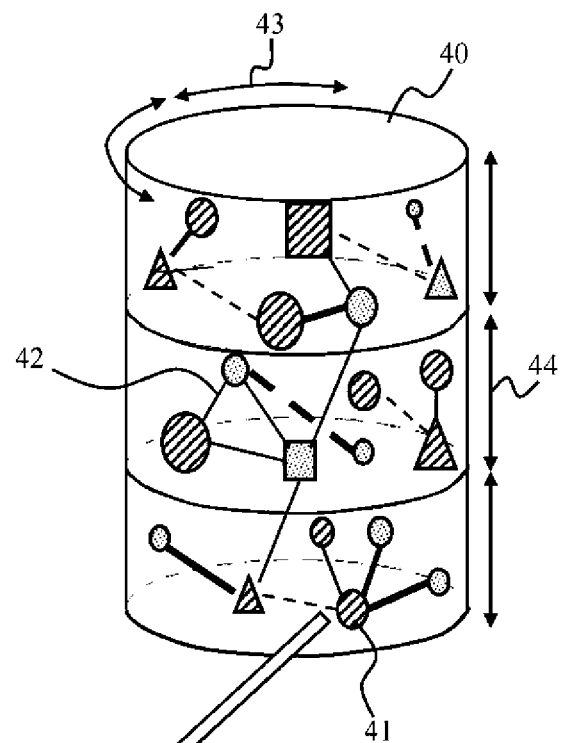
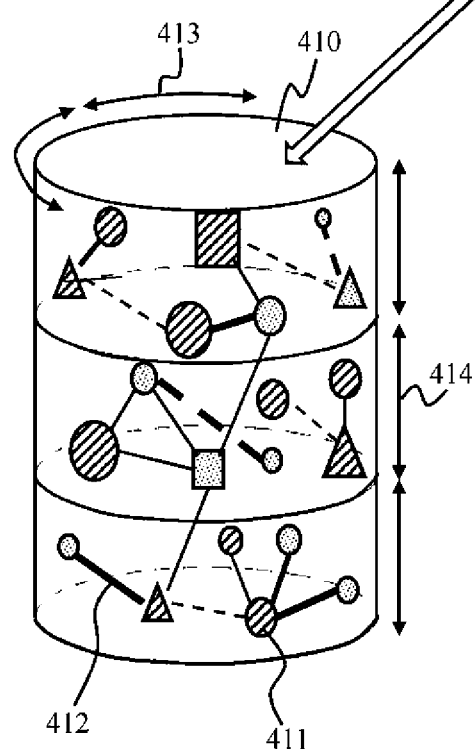

SOFTWARE ANALYSIS SUPPORT SYSTEM AND COMPUTER PROGRAM THEREFOR

TECHNICAL FIELD

The present invention relates to a software analysis support system and a computer program thereof.

BACKGROUND ART

In recent software development, derivative development of developing new software by extending or changing developed software as a base is mainstream. In derivative development of software, since software becomes complicated due to repeated function extension or change over many years, readability of source code is deteriorated, and it takes time and effort to understand a structure and behavior of software. Therefore, techniques for visualizing information of software components on a two-dimensional plane or a three-dimensional space to help understand a structure and behavior of software have been proposed (Patent Literatures 1 and 2).

CITATION LIST

Patent Literature

PTL 1: JP 2013-152576 A
PTL 2: JP 2004-5649 A

SUMMARY OF INVENTION

Technical Problem

In the method of Patent Literature 1, information of software components is displayed as figures of different colors on a two-dimensional plane. In the two-dimensional plane, the first axis indicates the direction of the dependence relationship, and the second axis indicates the strength of the dependence relationship between the programs. However, since each software component constituting the software has various attributes and the relationship between the software components is complicated, it is impossible to express the software components in a two-dimensional plane.

In Patent Literature 2, a graphic display of each node and a graphic display of a hierarchical relationship are arranged in a conical space. However, Patent Literature 2 can visualize the configuration of the software having the tree structure, but is not useful for understanding the configuration of the software that does not have the tree structure. Therefore, the technology of Patent Literature 2 is merely useful for analyzing some software, and has low versatility.

Further, in both Patent Literatures 1 and 2, the color, size, and axis definition of the figure are fixed in advance, and thus usability is low. In a software development site, it is necessary to observe and understand a software structure and the like from various viewpoints depending on a process or a role, but Patent Literatures 1 and 2 have room for improvement in terms of the usability of the user.

The present invention has been made in view of the above problems, and an object thereof is to provide a software analysis support system and a computer program thereof that enable a user to easily analyze software.

Solution to Problem

In order to solve the above problem, a software analysis support system that supports analysis of a structure of software according to the present invention includes at least one computer. The computer acquires software component information indicating a relationship and an attribute of each software component, acquires display element setting information in which a first display element corresponding to an attribute of each software component and a second display element corresponding to a relationship between each software component are set, the editable display element setting information, and arranges each of the first display element and the second display element at a predetermined position of a virtual space that displays the relationship of each software component on the basis of a plurality of predetermined attributes selected in advance among attributes of each software component.

Advantageous Effects of Invention

According to the present invention, since display element setting information in which a first display element corresponding to an attribute of each software component and a second display element corresponding to a relationship between software components are set is editable, the arrangement of the first display element and the second display element in the virtual space can be changed, and the understanding and usability of the structure of the software are improved.

BRIEF DESCRIPTION OF DRAWINGS

FIG. 3 is a configuration diagram illustrating individual software component information.

FIG. 4 is a configuration diagram illustrating relationship information between software components.

FIG. 5 is a configuration diagram illustrating a mapping setting that defines a correspondence between a software component and a display element.

FIG. 6 is a configuration diagram of the mapping setting subsequent to FIG. 5.

FIG. 8 is an example of a virtual space expressing a software structure and the like.

FIG. 9 is an explanatory diagram of a configuration of a software analysis support system according to a second embodiment.

FIG. 14 is an explanatory diagram illustrating a state of moving to a lower virtual space by selecting a display element in an upper virtual space according to a seventh embodiment.

DESCRIPTION OF EMBODIMENTS

Hereinafter, embodiments of the present invention will be described on the basis of the drawings. In the present embodiment, a configuration of software is expressed in a virtual space so that a user can confirm the configuration. Further, in the present embodiment, software having various structures can be analyzed from various viewpoints by changing the expression form in the virtual space.

In the present embodiment, the configuration of each software component constituting the software and the relationship between the software components are visualized so as to be easily understood by the user. The unit of the software component may be any of a class, a module, a file, a function, a block, and the like. That is, in the present embodiment, it is possible to visualize the configurations of units constituting a part of the source code.

In the present embodiment, the attribute of the component constituting the software can be arbitrarily assigned to each element constituting the virtual space. The elements constituting the virtual space include, for example, space shapes such as a cylinder, a box, and a sphere, lines and points displayed in the virtual space, and attributes thereof (color, size, thickness, and the like).

In the present embodiment, as described later, when the software component information and the mapping setting that defines the correspondence relationship between the attribute of the software component and the display element (drawing object) are input, the configuration and the like of the software to be analyzed are expressed in the virtual space.

According to the present embodiment, the user can set information for visualizing the software component information on the basis of a desired viewpoint (from which viewpoint the software component information is visualized), and can analyze the software component information. Hereinafter, an example of the present embodiment will be described in detail.

First Embodiment

Figure 1:
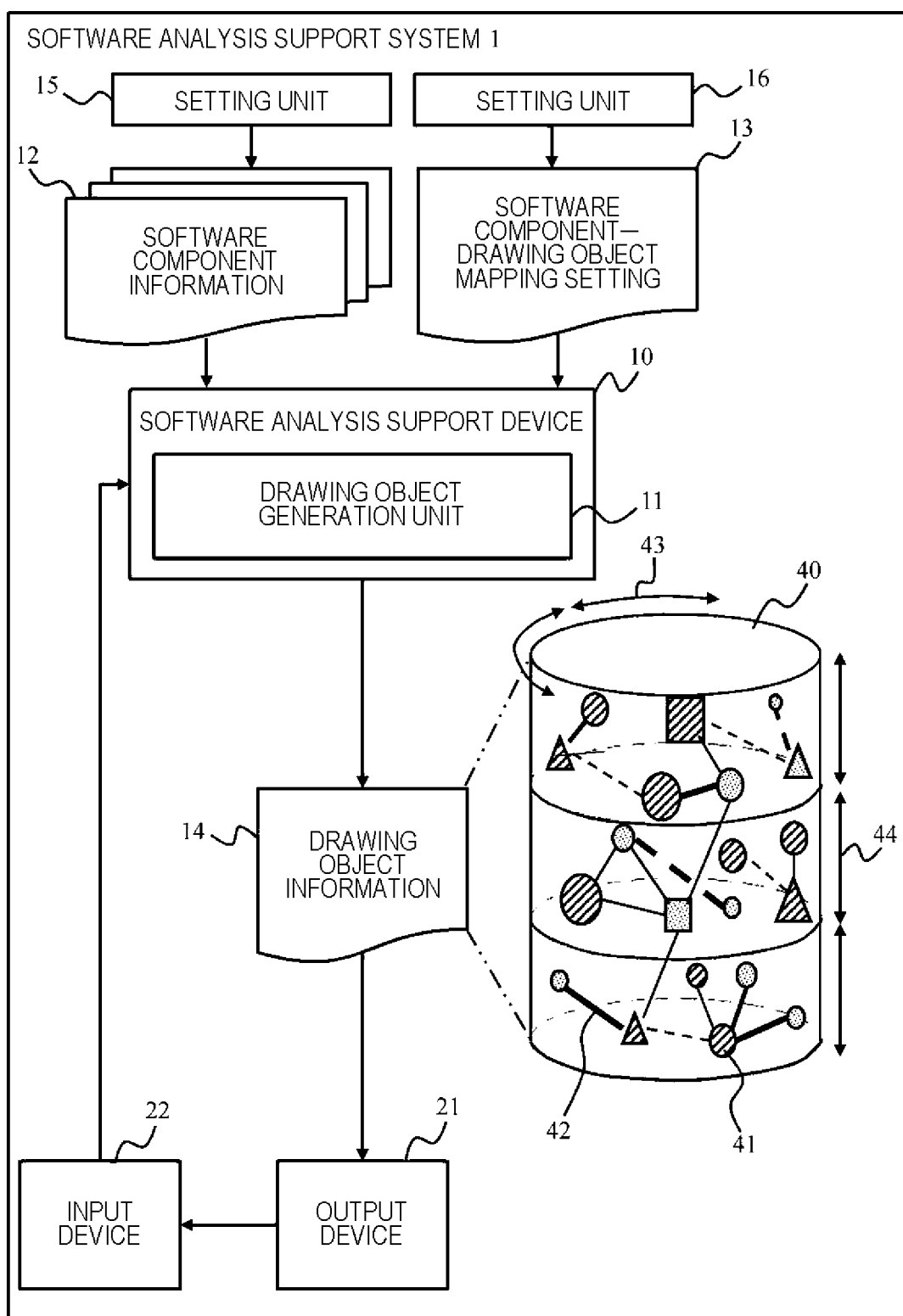
FIG. 1 is a functional configuration diagram of a software analysis support system.

A first embodiment will be described with reference to FIGS. 1 to 8. FIG. 1 illustrates a functional configuration of a software analysis support system 1. The software analysis support system 1 (hereinafter, it may be abbreviated as a system 1) analyzes the structure and the like (configuration, behavior, and the like) of the software selected as the analysis target and displays the analysis result in a virtual space 40 to support the user's understanding of the analysis target software.

The system 1 includes, for example, a software analysis support device 10 having a drawing object generation unit 11, software component information 12, software component-drawing object mapping setting 13, drawing object information 14, setting units 15 and 16, an output device 21, and an input device 22.

The information 12, 13, and 14 is stored in a storage device 103 described later with reference to FIG. 2. The software component information 12 is information on each software component constituting the software, and details thereof will be described later with reference to FIGS. 3 and 4. The software component-drawing object mapping setting 13 is information defining a correspondence between a software component and a drawing object as a "display element", and details thereof will be described later with reference to FIGS. 5 and 6. Hereinafter, the software component-drawing object mapping setting 13 may be abbreviated as mapping setting 13.

The drawing object generation unit 11 is a function of generating the drawing object information 14 for expressing the configuration and the connection relationship of the software components in the virtual space 40 on the basis of the software component information 12 and the mapping setting 13.

The drawing object information 14 is information for arranging and visualizing a point object 41 as a "first display element" that symbolizes the attribute of the software component and a line object 42 as a "second display element" that symbolizes the relationship between the software components in a predetermined virtual space 40.

Here, a "first attribute" of the software component is assigned to the circumferential direction of the virtual space as a θ axis 43. A "second attribute" of the software component is assigned as a Z axis 44 in the axial direction of the virtual space 40. As described later, the first attribute is a directory of a software component, and the second attribute is a hierarchy to which the software component belongs. Further, as in another embodiment to be described later, a "third attribute" of the software component can be assigned to the radial direction of the virtual space 40 as an r axis.

The user of the present system 1 can place the viewpoint at a predetermined position in the virtual space 40, for example, by wearing virtual reality (VR) goggles. Then, the user can grasp the relationship between the software components by visually recognizing objects 41 and 42 from the inside of the virtual space 40. Further, although not illustrated, the user can select an arbitrary object 41 to display the source code of the software component corresponding to the object in the virtual space 40 and perform editing work.

The setting unit 15 is a function of setting the software component information 12 input to the system 1 by the user. The other setting unit 16 is a function of setting the mapping setting 13 input to the system 1 by the user. In this manner, the user can manually specify the software or the software component to be analyzed and set the viewpoint of expression in the virtual space 40. Note that, at the time of manual setting, the system 1 may recommend a setting method, a setting value, or the like to the user.

The output device 21 is a function of providing information from the system 1 to the user. When the drawing object information 14 is input, the output device 21 outputs an image in which the objects 41 and 42 are arranged in the virtual space 40 to the display.

The input device 22 is a function of a user inputting an instruction or the like to the system 1. The input device 22 transmits the operation content by the user to the software analysis support device 10. Further, although not illustrated in FIG. 1, the user can also set the software component information 12 and the mapping setting 13 via the setting units 15 and 16 by using the input device 22.

Figure 2:
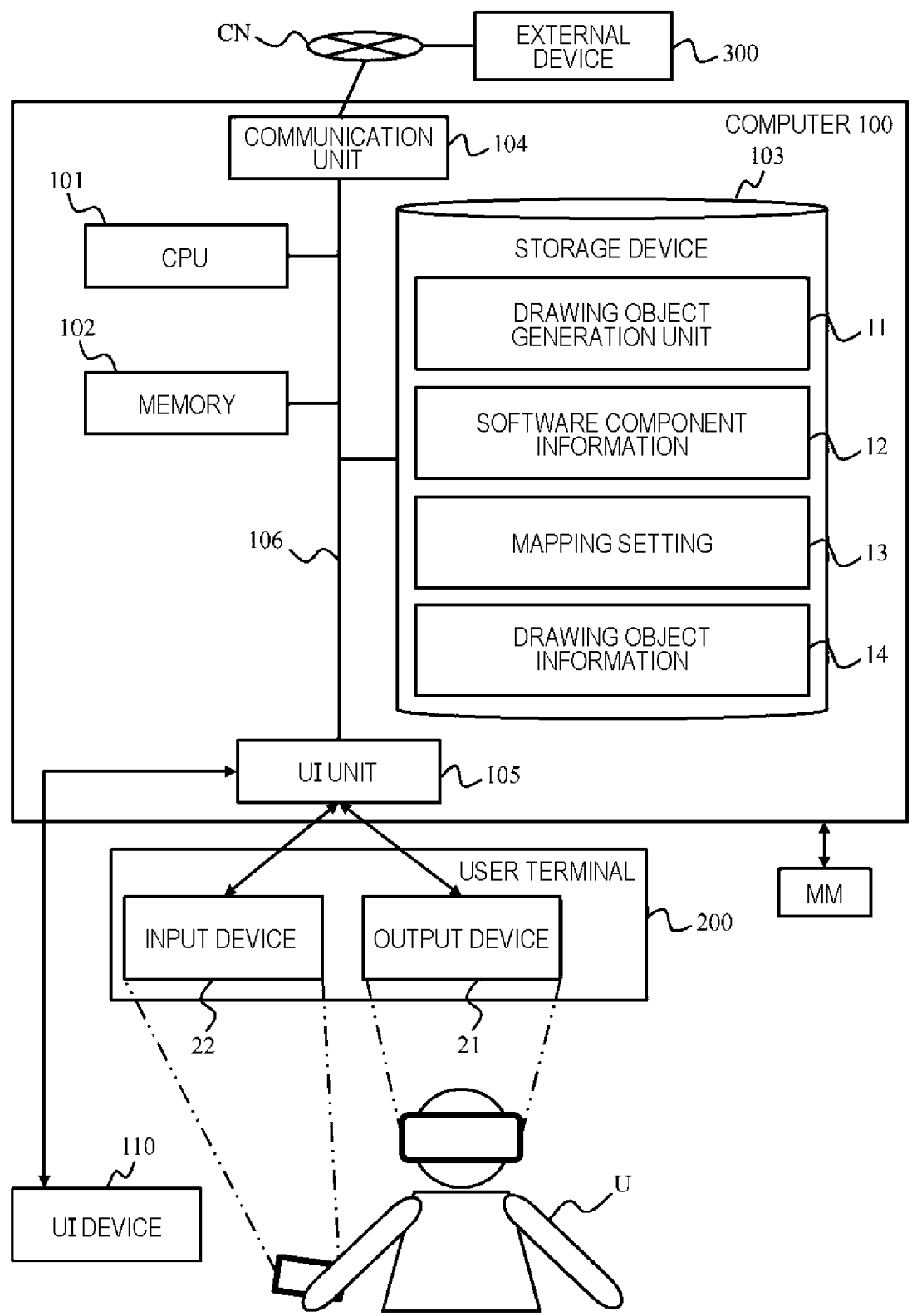
FIG. 2 is a hardware configuration diagram of the software analysis support system.

FIG. 2 is an example of a hardware configuration of the software analysis support system 1. The system 1 can include, for example, one or more computers 100 and one or more user terminals 200.

The computer 100 includes, for example, a microprocessor 101 (in the drawing, the CPU 101), a memory 102, a storage device 103, a communication unit 104, and a user interface unit 105 (in the drawing, the UI unit 105).

The microprocessor 101 implements a function as a software analysis support device by reading a computer program stored in the storage device 103 into the memory 102 and executing the computer program.

The storage device 103 stores, for example, a computer program for realizing the drawing object generation unit 11, the software component information 12, the mapping setting 13, and the drawing object information 14. In addition, an operating system, a device driver, and the like are also stored in the storage device 103, but are omitted here.

The communication unit 104 is a device for communicating with an external device 300 via a communication network CN. The communication network CN may be, for example, either a public line network such as the Internet or a dedicated line network. Further, the communication network CN may be either wired communication or wireless communication.

The external device 300 is, for example, another computer, a storage device, or the like. The computer program for realizing the drawing object generation unit 11 may be transmitted from the external device 300 to the computer 100 and installed. All or part of the information 12, 13, and 14 may be transmitted from the external device 300 to the computer 100 and stored in the storage device 103.

The user interface unit 105 is connected to the user terminal 200 and/or a user interface device 110. The user interface device 110 is a device for a user, a system administrator, or the like to set the mapping setting 13 and the like for the system 1. The user interface device 110 may include, for example, a keyboard, a display, a printer, and the like.

The user terminal 200 includes the output device 21 configured as, for example, VR goggles (VR head-mounted display) and the input device 22. Instead of the VR terminal, at least a part of the user terminal 200 may be configured as, for example, a personal computer, a mobile phone, a personal digital assistant, a tablet, or a wearable terminal.

Note that all or a part of the computer program can be input to or output from the storage device 103 by using the external storage medium MM that can be read and written by the computer 100. Examples of the external storage medium MM include a flash memory device and a hard disk device.

FIG. 3 illustrates an example of individual software component information 121 which is one of the software component information 12.

The individual software component information 121 is information for managing a plurality of attributes of the software component information. Examples of the attributes (also referred to as attribute names) of each software component include a software component number 1211, the number of rows 1212, a last update date and time 1213, a last updater 1214, a directory structure 1215, a hierarchy 1216, and a complexity 1217. The attribute names mentioned here are merely examples, and part of the attribute names described above may not be included in the individual software component information 121. Alternatively, other attributes 1218 other than the above-described attribute name may be included in the individual software component information 121.

One record 1210 of the individual software component information 121 is an example of information in which a value corresponding to each attribute name of each software component is described.

FIG. 4 illustrates an example of software component relationship information 122 which is another piece of the software component information 12. The software component relationship information 122 (hereinafter, also referred to as relationship information 122) is information for managing an attribute name indicating a relationship between each piece of software component information.

The relationship information 122 manages, for example, a software component call relationship number 1221, a caller software component number 1222, a callee software component number 1223, the number of calls 1224, and a same module call 1225. The above-described attribute names are merely examples, and some attribute names may not be included, or other attribute names 1226 may be included.

One record 1220 of the relationship information 122 is an example of information in which a value corresponding to each attribute name indicating the relationship of each piece of software component information is described.

An example of the mapping setting 13 will be described with reference to FIGS. 5 and 6. As described above, the mapping setting 13 is information that associates the objects 41 and 42 displayed in the virtual space 40 with the attributes of the software components, and can be edited by the user.

The mapping setting 13 includes, for example, a drawing object name 131, an attribute 132 of a drawing object, an attribute 133 of a corresponding software component, and an association method 134. The mapping setting record 130 is an example of information describing a value corresponding to each item 131 to 134.

FIG. 5 illustrates mapping settings related to the point object 41. For example, the point object 41 has a plurality of attributes such as "body", "color", "shape", "size", "e coordinate", and "Z coordinate".

The "main body" indicates the presence of the point object 41 and corresponds to the component number 1211 (see FIG. 3) of the software component. One software component is displayed in the virtual space 40 as one point object 41.

The "color" is the color of the point object 41, and a value thereof is determined on the basis of the last update date and time 1213 (see FIG. 3) of the software component corresponding to the point object 41. For example, when the last update date and time is within a predetermined time (for example, within one week) of the current time, the point object 41 is expressed in a predetermined color (for example, red), and when the last update date and time is not within the predetermined time of the current time, the point object 41 is expressed in another color (for example, white).

The "shape" is the shape of the point object 41, and a value thereof is determined on the basis of the complexity 1217 (see FIG. 3) of the software component corresponding to the point object 41. For example, the shape is set to be spherical when the complexity is c1 or more and less than c2, to be a regular tetrahedron when the complexity is c2 or more and less than c3, and to be a regular hexahedron when the complexity is c3 or more.

Note that the complexity 1217 can also be referred to as a "predetermined score determined on the basis of the complexity" or a "complexity score".

The "size" is the size of the point object 41, and a value thereof is set on the basis of the number of rows 1212 (see FIG. 3) of the software component corresponding to the point object 41. That is, the point object 41 becomes larger as the number of rows of the software components becomes larger.

The "θ coordinate" indicates a position on the θ axis 43 (a region obtained by dividing a cylindrical virtual space in the circumferential direction) defined in the virtual space 40. The value of the θ axis is determined on the basis of the directory structure 1215 (see FIG. 3) of the software component corresponding to the point object 41. For example, the virtual space 40 in the circumferential direction can be divided into a plurality of regions, and each region and a directory range can be associated in advance. This association can be freely performed by the user. The user can intuitively understand in which range on the directory structure the software component is located by confirming the region on the θ axis where the point object 41 is arranged.

The "Z coordinate" indicates a position on a Z coordinate 44 (a region obtained by dividing the cylindrical virtual space in the axial direction) defined in the virtual space 40. The value of the Z axis is determined on the basis of the hierarchy 1216 (see FIG. 3) to which the software component corresponding to the point object 41 belongs. For example, the hierarchy 1216 is classified into a driver layer, a middle layer, and an application layer, and the driver layer, the middle layer, and the application layer are positioned in order from the bottom of the Z axis 44. The user can intuitively understand which hierarchy the software component belongs to by confirming the region on the Z axis where the point object 41 is arranged. The user can freely set to which region on the Z axis the software components at which levels are allocated.

FIG. 6 illustrates the mapping setting for the line object 42. The line object 42 has a plurality of attributes such as "main body", "start point", "end point", "thickness", and "color", for example.

The "main body" indicates the existence of the line object 42 and corresponds to the number 1221 (see FIG. 4) for managing the calling relationship between the software components. One call relationship number is displayed in the virtual space 40 as one line object 42.

The "start point" is the start point of the line object 42, and corresponds to the component number 1211 of the software component of the caller in the call relationship specified by the call relationship number.

The "end point" is the end point of the line object 42 and corresponds to the component number 1211 of the software component of the call destination in the call relationship specified by the call relationship number.

The "thickness" is the thickness of the line object 42, and a value thereof is determined on the basis of the number of calls 1224 of the software component corresponding to the line object 42. As the number of calls increases, the line object 42 is displayed thicker.

The "color" is the color of the line object 42, and a value thereof is determined depending on whether it is the call 1225 (see FIG. 4) in the same module. For example, in the case of calling from the same module, the line object 42 is displayed in blue, and otherwise, the line object 42 is displayed in white.

How to express the line object 42 indicating the relationship between the software components in the virtual space 40 can be freely set by the user. The user can intuitively understand the relationship between the software components from the expression form of the line object 42 displayed in the virtual space 40.

Figure 7:
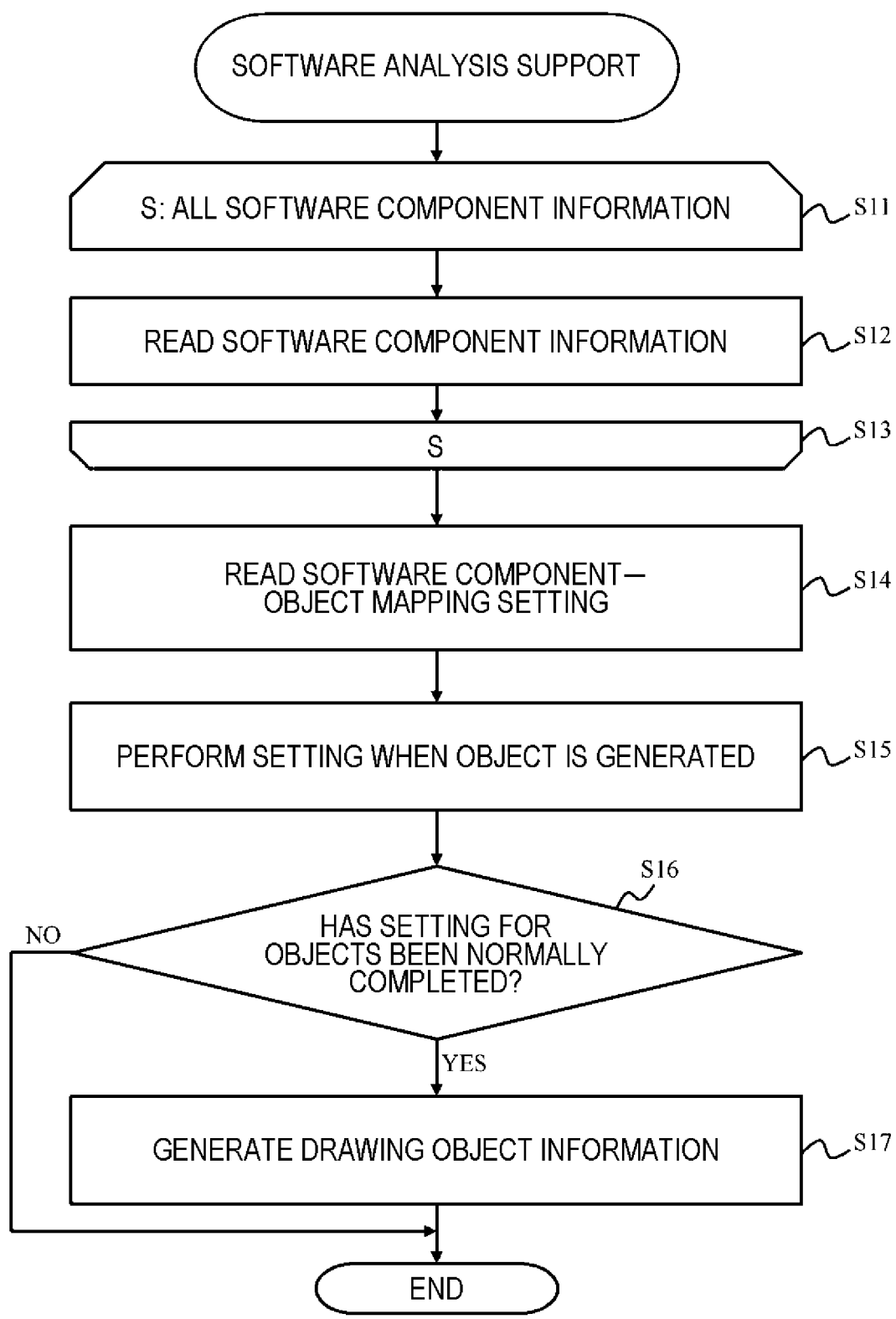
FIG. 7 is a flowchart illustrating software analysis support processing.

FIG. 7 is a flowchart of software analysis support processing. The drawing object generation unit 11 of the software analysis support device 10 reads all the software component information 12 from the storage device 103 (S11 to S13), and subsequently reads the mapping setting 13 from the storage device 103 (S14).

Then, the drawing object generation unit 11 sets the display method of the point object 41 and the line object 42 to be displayed in the virtual space 40 (S15), and determines whether the setting for all the objects has been normally completed (S16).

When the setting of all the objects is normally completed (S16: YES), the drawing object generation unit 11 generates the drawing object information 14 on the basis of the setting, stores the drawing object information in the storage device 103 (S17), and ends the process. On the other hand, when the setting of the object is not normally completed (S16: NO), this process is ended.

Thus, the drawing object generation unit 11 generates the drawing object information 14 on the basis of each piece of software component information 12 and the mapping setting 13.

Figure 8:
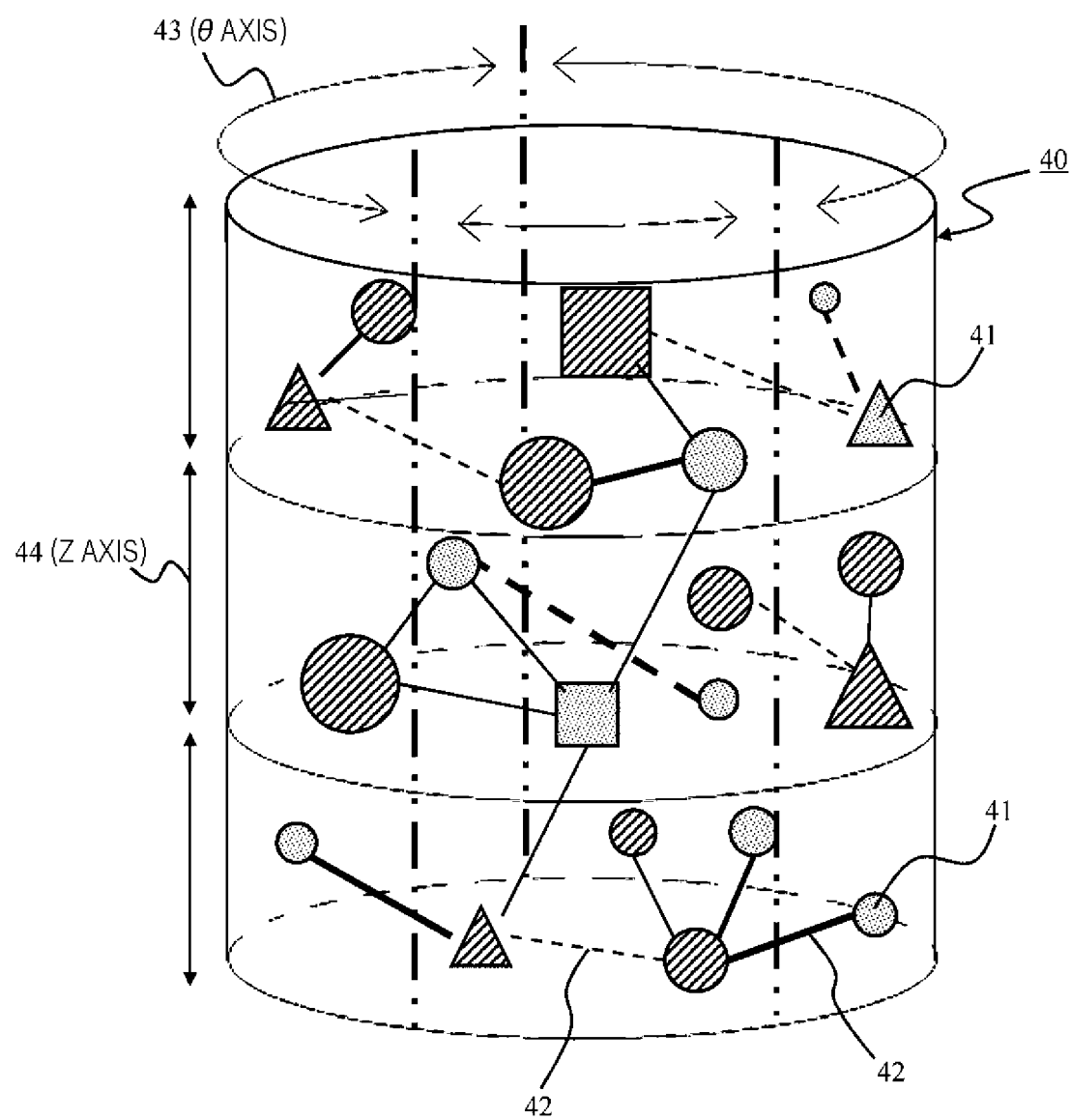

FIG. 8 illustrates a software analysis result drawn by the output device 21. In FIG. 8, a plurality of point objects 41 are arranged on the circumferential surface of the cylindrical virtual space 40. As described above, one point object 41 corresponds to one software component (software component information 12).

A certain point object 41 and another point object 41 may be connected by the line object 42. As described above, the line object 42 illustrates the relationship between software components.

As coordinate axes for determining the coordinates of the point object 41, the θ axis 43 and the Z axis 44 are used in the example of FIG. 8. The value of the θ axis 43 is determined on the basis of the directory to which the software component belongs. The value of the Z axis 44 is determined on the basis of the hierarchy to which the software component belongs.

An example of a flow from generation of the drawing object information 14 by the user using the software analysis support device 10 to visualization and browsing of the software components and the relationship between the software components on the basis of the drawing object information 14 will be described.

First, the user prepares the software component information 12 and the mapping setting 13. It is assumed that the user prepares the individual software component information 121 and the software component relationship information 122 as the software component information 12. The user may download the software component information 12 and the mapping setting 13 from the external device 300 to the storage device 103, or may transfer the software component information 12 and the mapping setting 13 from the external storage medium MM to the storage device 103. The user may rewrite all or a part of the software component information 12 or the mapping setting 13 via the setting units 15 and 16.

As described in FIG. 3, the individual software component information 121 has an attribute name list such as the software component number 1211, the number of rows 1212, the last update date and time 1213, the last updater 1214, the directory structure 1215, the hierarchy 1216, and the complexity 1217. The record 1210 is an example of a record in which a value corresponding to each attribute name of each software component is described. Actually, many records are included in the software component information 121.

As described in FIG. 4, the relationship information 122 between the software components has an attribute name list such as the software component call relationship number 1221, the caller software component number 1222, the callee software component number 1223, the number of calls 1224, and the same module call 1225. The record 1220 is an example of a record in which a value corresponding to each attribute name of each software component is described. Actually, many records are included in the software component relationship information 122.

Next, the user prepares the mapping setting 13. As described with reference to FIGS. 5 and 6, the mapping setting 13 includes the drawing object name 131, the attribute 132 of the drawing object, the attribute 133 of the corresponding software component, and the association method 134.

The software component number 1211 corresponds to "main body" which is an attribute of the point object 41. The association method is, for example, "one point corresponds to one software component number".

The attribute "color" of the point object 41 corresponds to the last update date and time 1213. The association method is, for example, "if the last update date and time is within a predetermined time from the current time, red corresponds, otherwise white corresponds".

The complexity 1217 corresponds to the attribute "shape" of the point object 41. The association method is, for example, "the shape corresponds to a sphere when the complexity is c1 or more and less than c2, corresponds to a regular tetrahedron when the complexity is c2 or more and less than c3, and corresponds to a regular hexahedron when the complexity is c3 or more".

The number of rows corresponds to the attribute "size" of the point object 41. The association method is, for example, "the size of the point is proportional to the number of rows".

A directory structure corresponds to the attribute "θ coordinate" of the point object 41. The association method is, for example, "the θ coordinate of the point object is any value of 0 degrees or more and less than 120 degrees when the directory structure is src/G1/*, the θ coordinate of the point object is any value of 120 degrees or more and less than 240 degrees when the directory structure is src/G2/*, and the θ coordinate of the point object is any value of 240 degrees or more and less than 360 degrees when the directory structure is src/G3/*".

The hierarchy corresponds to the attribute "Z coordinate" of the point object 41. The association method is, for example, "the Z coordinate of the point object is any value of 0 or more and less than 100 when the hierarchy is the driver layer, the Z coordinate of the point object is any value of 100 or more and less than 200 when the hierarchy is the middle layer, and the Z coordinate of the point object is any value of 200 or more and less than 300 when the hierarchy is the application layer".

The attribute "body" of the line object 42 corresponds to the software component calling relation number. The association method is, for example, "one line corresponds to one software component call relation number".

The attribute "start point" of the line object 42 corresponds to the caller software component number. The association method is, for example, "the point object whose software component number is the caller software component number corresponds to the start point of the line object".

The attribute "end point" of the line object 42 corresponds to the callee software component number. The association method is, for example, "a point object whose software component number is a callee software component number corresponds to the end point of the line object".

The attribute "thickness" of the line object 42 corresponds to the number of calls. The association method is, for example, "the thickness of the line object is proportional to the number of calls".

The attribute "color" of the line object 42 corresponds to a call in the same module. The association method is, for example, "when a call in the same module is "TRUE", the line object is blue, and when a call in the same module is "FALSE", the line object is white".

As described above, the software analysis support device (drawing object generation unit 11) reads the individual software component information 121, the software component relationship information 122, and the mapping setting 13 (S11 to S14 in FIG. 7), and performs setting at the time of object generation (S15). The software analysis support device 10 confirms that the setting at the time of object generation is normally completed (S16: YES), and generates the drawing object information 14 (S17). The drawing object information 14 is information including information necessary for the output device 21 to draw the analysis result of the software in the virtual space 40.

The output device 21 reads the drawing object information 14 and draws the virtual space 40 and the objects 41 and 42 as illustrated in FIG. 8.

In FIG. 8, the figure of the point object 41 actually indicates the shape of the point object. A point object indicated by an equilateral triangle in FIG. 8 indicates that the point object is actually a regular tetrahedron. A point object indicated by a circle in FIG. 8 is actually a sphere. A point object indicated by a square in FIG. 8 is actually a regular hexahedron.

The output device 21 draws the drawing content as illustrated in FIG. 8 on the virtual 3D space, and the user views the drawing content through the planar display. Alternatively, the output device 21 draws the drawing content as illustrated in FIG. 8 on the VR space, and the user views the drawing content through the head mounted display device.

According to the present embodiment configured as described above, the user can visualize the software component information on the virtual space 40 on the basis of a desired viewpoint, thereby intuitively understanding and analyzing the software component information. That is, the user can intuitively and roughly grasp the outline of the software components (which directory and which hierarchy the software component belongs to, how complex, how large the number of rows is, whether it has been updated recently, etc.) by visually recognizing the objects 41 and 42 arranged in the virtual space 40, and thus, the usability is improved.

Second Embodiment

A second embodiment will be described with reference to FIG. 9. In the following embodiments including the present embodiment, differences from the first embodiment will be mainly described.

A software analysis support system 1A according to the present embodiment provides the user with a plurality of virtual spaces 40(1) to 40(4) for a plurality of pieces of software. That is, the virtual spaces 40(1) to 40(4) correspond to different pieces of software, respectively, and represent software components in the respective pieces of software and relationships thereof.

Further, as illustrated as "R=38" and "R=80" in FIG. 9, the software analysis support system 1A calculates the degree of relevance between the software (virtual space) selected by the user and the other software, and displays the degree of relevance in the virtual space 40.

That is, when the software corresponding to the virtual space 40(1) selected by the user among the virtual spaces 40(1) to 40(4) is specified (S21), the software analysis support system 1A calculates the degree of relevance between the software specified in Step S21 and other software (software corresponding to the virtual spaces 40(2) to 40(4)) (S22). Then, the software analysis support system 1A displays the degree of relevance calculated in Step S22 in association with the virtual spaces 40(2) to 40(4) (S23).

A method of calculating the degree of relevance is not limited. As an example, the degree of relevance may be calculated by comparing display contents of the respective virtual spaces 40. For example, the degree of relevance between pieces of software may be calculated from the viewpoint of expression such as the position, size, shape, and color of the objects 41 and 42. That is, the degree of relevance between pieces of software may be calculated from the similarity in appearance when expressed in the virtual space 40. As a result, even for different software such as a purpose or a destination, it is possible to find software having a similar essential structure, and it is possible to use the software for improving the software which the user is in charge of.

This embodiment configured as described above achieves the same operational effects as the first embodiment. Further, in the present embodiment, since a plurality of virtual spaces corresponding to a plurality of pieces of software can be displayed and the degree of relevance between the virtual spaces can be displayed, the user can find and use related software, and usability is improved.

Third Embodiment

Figure 10:
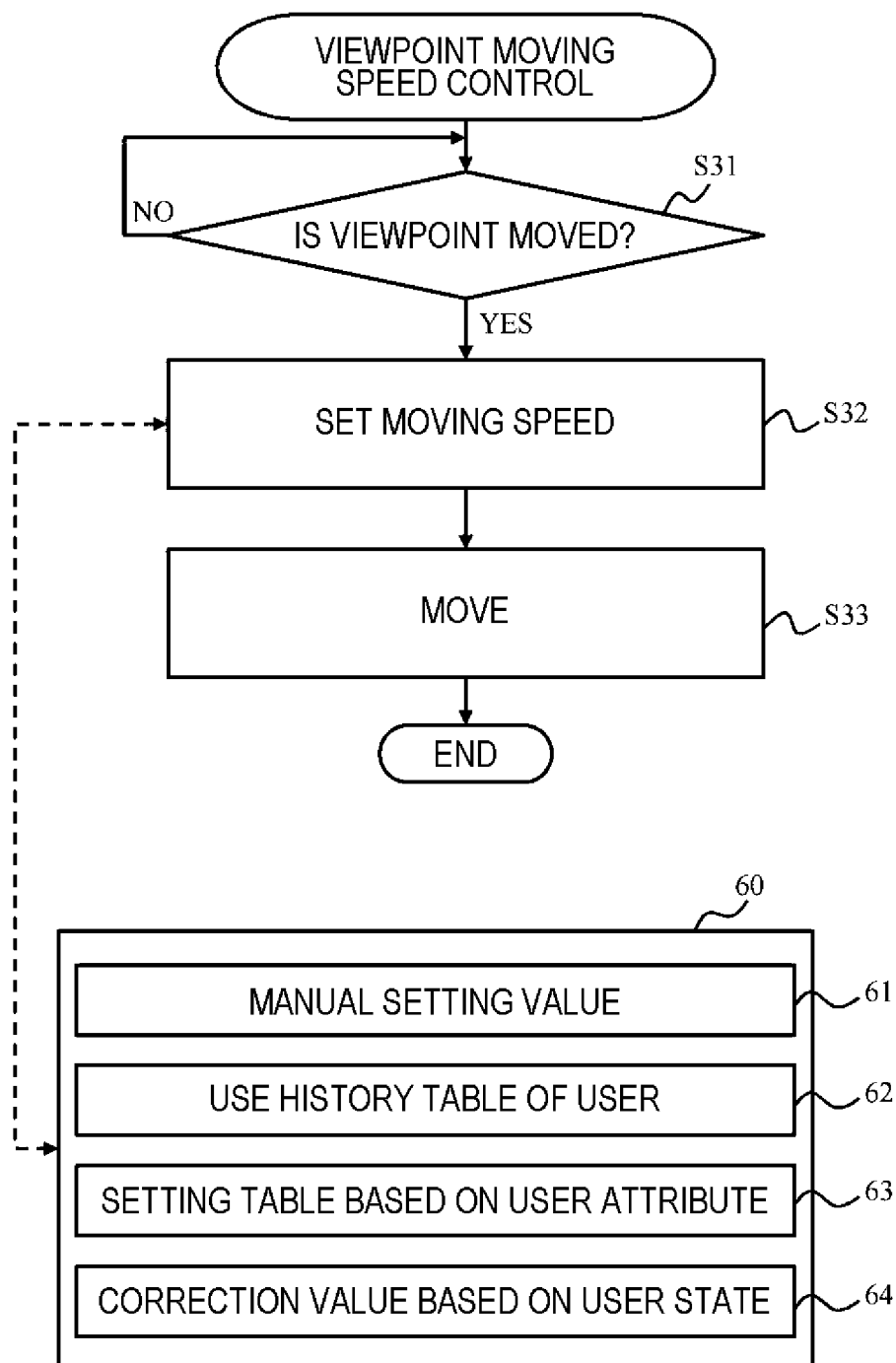
FIG. 10 is a flowchart illustrating processing of controlling speed in a case where a plurality of virtual spaces move according to the third embodiment.

A third embodiment will be described with reference to FIG. 10. In the present embodiment, the speed in the case of moving the viewpoint of the user in the virtual space 40 or outside the virtual space 40 is controlled.

As described in the second embodiment, the user's viewpoint can be moved to the inside of any of the plurality of virtual spaces 40(1) to 40(4), or the user's viewpoint can be moved from a certain virtual space to another virtual space. Alternatively, the user's viewpoint can be moved within the virtual space, as described in FIG. 12.

In the present embodiment, when the user's viewpoint is moved (S31: YES), the moving speed is set (S32), and the user's viewpoint is moved at the set speed (S33).

The moving speed of the user's viewpoint can be determined, for example, on the basis of a moving speed management table 60. The moving speed management table 60 can include, for example, one or more of a table 61 that stores a manual setting value of the user, a table 62 that manages a use history of the user, a setting table 63 based on a user attribute, a table 64 that stores a correction value based on a user state, and the like. The moving speed of the user's viewpoint may be set from a table or a function other than the illustrated tables.

The use history table 62 of the user manages the moving speed of the user's viewpoint when the user used the software analysis support system in the past. In the setting table 63 based on the user attribute, for example, the moving speed of the user's viewpoint is set from the user attribute such as the age, preference, and exercise habit of the user. The table 64 storing the correction value based on the user state stores, for example, a correction coefficient for adjusting the moving speed of the user's viewpoint on the basis of the current health state (heart rate, blood pressure, etc.) of the user.

This embodiment configured as described above achieves the same operational effects as the first embodiment. Further, in the present embodiment, since the speed at which the user moves the viewpoint inside and outside the virtual space can be set, the usability is further improved.

Fourth Embodiment

Figure 11:
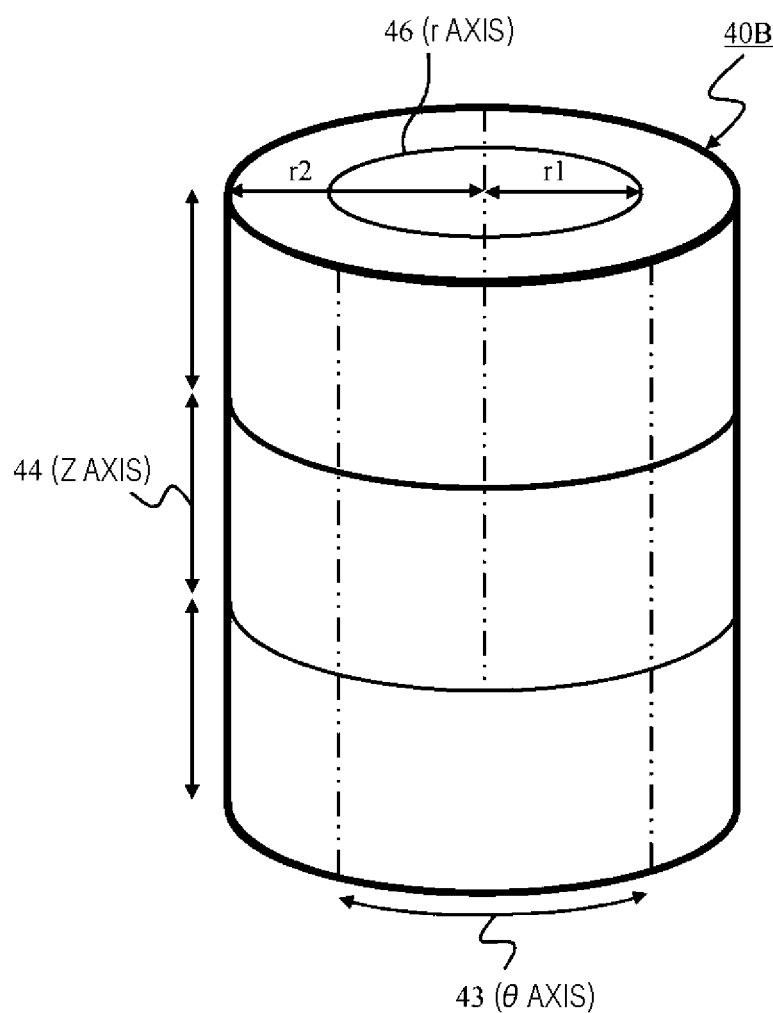
FIG. 11 is an explanatory diagram illustrating a state in which a third axis (radial direction) is set in a virtual space according to a fourth embodiment.

A fourth embodiment will be described with reference to FIG. 11. In the present embodiment, in addition to the θ axis 43 in the circumferential direction and the Z axis 44 in the axial direction of the cylindrical virtual space 40B, an r axis 46 in the radial direction is also used. The r axis 46 is set according to the distance from the axis of the virtual space 40B. In the r axis 46, for example, a plurality of regions including a peripheral surface located at a radius r1 from the axial center and a peripheral surface located at a radius r2 (r2>r1) from the axial center are set. For example, an attribute such as "updater" can be assigned to the r axis 46. Other attributes may be assigned to the r axis 46.

This embodiment configured as described above achieves the same operational effects as the first embodiment. Further, in the present embodiment, since not only the θ axis and the Z axis but also the r axis can be used, the expressive power can be further enhanced, and the usability of the user is improved.

Fifth Embodiment

Figure 12:
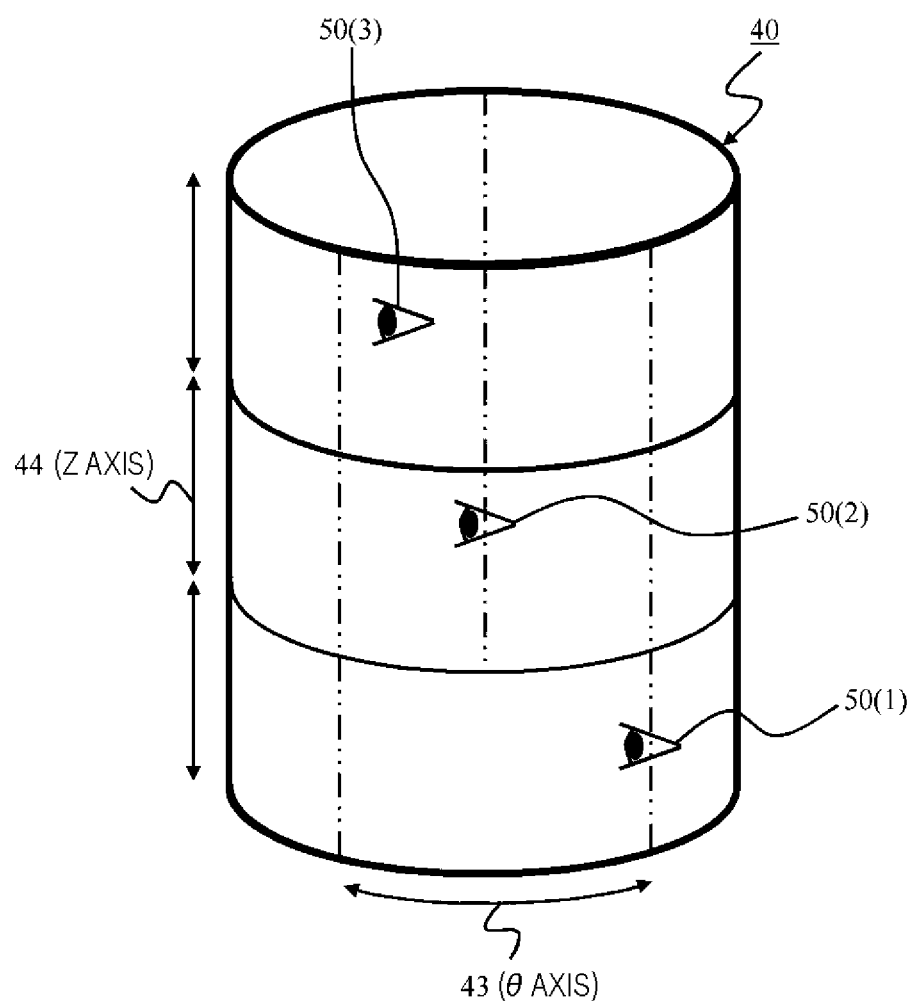
FIG. 12 is an explanatory diagram illustrating that a reference position of a viewpoint of a user can be moved in a virtual space according to a fifth embodiment.

A fifth embodiment will be described with reference to FIG. 12. In the present embodiment, the position of the user's viewpoint 50 in the virtual space 40 can be adjusted.

The user's viewpoint 50(1) may be set in a lower portion of the virtual space 40, the user's viewpoint 50(2) may be set in a center portion of the virtual space 40, or the user's viewpoint 50(3) may be set in an upper portion of the virtual space 40.

For example, the user uses the lower viewpoint 50(1) when considering the software components of the driver layer, the center viewpoint 50(2) when considering the software components of the middle layer, and the upper viewpoint 50(3) when considering the software components of the application layer. Alternatively, the user can reduce the angle of shaking the head up and down in the virtual space 40 by using the center viewpoint 50(2), and the usability is improved.

This embodiment configured as described above achieves the same operational effects as the first embodiment. Further, in the present embodiment, since the user's viewpoint 50 can be adjusted in the virtual space 40, the usability of the user is improved.

Sixth Embodiment

Figure 13:
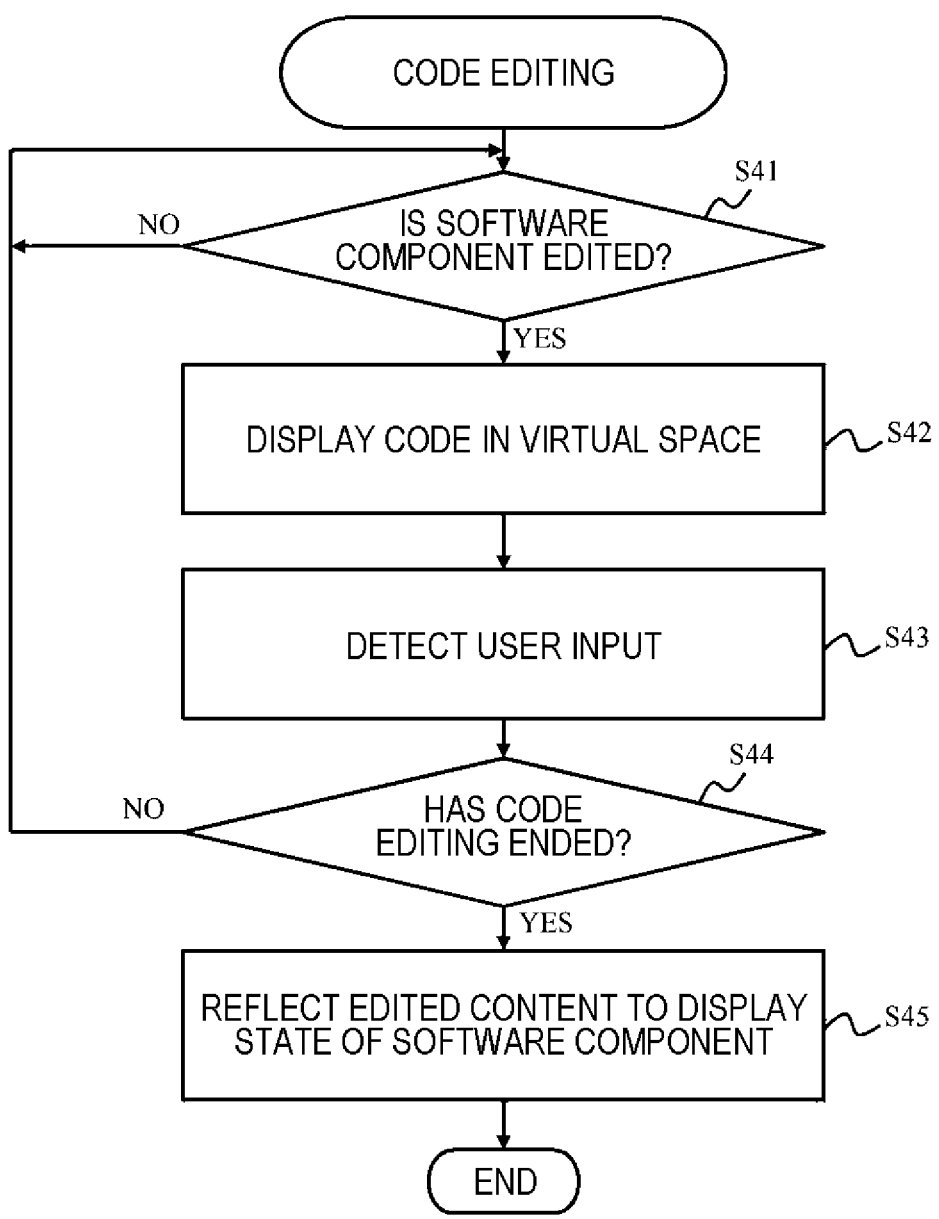
FIG. 13 is a flowchart illustrating processing of changing contents of a software component in a virtual space and reflecting a change result in the virtual space according to a sixth embodiment.

A sixth embodiment will be described with reference to FIG. 13. In the present embodiment, the user can edit (rewrite or the like) the software component information 12 in the virtual space 40, and can reflect the editing result in the virtual space 40.

The software analysis support device 10 determines whether the user desires to edit the software component information 12 (S41). For example, the user can select a desired point object from among the point objects 41 displayed in the virtual space 40 and operate an edit button (not illustrated) to edit the code of the software component information 12 corresponding to the selected point object 41.

When the user desires to edit the software component information 12 (S41: YES), the software analysis support device displays the code of the selected software component information 12 in the virtual space 40 (S42). The user can edit the code, for example, using a virtual keyboard (not illustrated) displayed in the virtual space 40. The software analysis support device 10 detects an input from the user (S43).

Note that the edit button and the virtual keyboard can also be realized by using the input device 22.

The software analysis support device 10 determines whether the editing work by the user has ended (S44), and if the editing has ended (S44: YES), reflects the editing work on the display state of the software component information 12 to be edited according to the editing by the user (S45). For example, in a case where the number of rows of the software component information 12 increases or decreases, the size of the point object 41 changes accordingly, and in a case where the complexity of the software component information 12 changes, the shape of the point object 41 changes accordingly. Note that, in a case where the user's editing work has not been completed (S44: NO), the process returns to Step S41.

This embodiment configured as described above achieves the same operational effects as the first embodiment. Further, in the present embodiment, the user can edit the software component information 12 in the virtual space 40, and can reflect the result of the editing work on the display state of the virtual space 40.

The user can intuitively grasp the configuration of the software from the arrangement and display state of each of the objects 41 and 42 in the virtual space 40, can rewrite the desired software component information 12 according to the understanding, and can confirm the result of the work by reflecting the work in the virtual space 40. Therefore, the usability of the user is further improved.

Seventh Example

A seventh embodiment will be described with reference to FIG. 14. In the present embodiment, when the point object 41 in the virtual space 40 is selected, the virtual space 410 indicating the configuration of the software component information 12 corresponding to the selected point object 41 is displayed.

The virtual space 40 indicating the analysis result of the higher-level software includes the virtual space 410 indicating the analysis result of the software component information 12 constituting the higher-level software. Similarly to the upper virtual space 40, the lower virtual space 410 includes a point object 411, a line object 412, a θ axis 413, and a Z axis 414. The point object 411 is, for example, a function or a block.

This embodiment configured as described above achieves the same operational effects as the first embodiment. Further, in the present embodiment, when the point object 41 of the virtual space 40 of the higher level is selected, the virtual space 410 of the lower level that visualizes the analysis result of the software component information 12 corresponding to the point object 41 can be displayed. Therefore, the present embodiment is useful for configuration analysis of complex software, and the usability of the user is improved.

Note that the present invention is not limited to the above-described embodiments, and includes various modifications. For example, the above embodiments have been described in detail for easy understanding of the invention, and the invention is not necessarily limited to having all the configurations described. A part of the configuration of a certain embodiment can be replaced with the configuration of another embodiment, and the configuration of another embodiment can be added to the configuration of a certain embodiment. It is possible to add, delete, and replace other configurations for a part of the configuration of each embodiment.

REFERENCE SIGNS LIST 1, 1A software analysis support system
10 software analysis support device
11 drawing object generation unit
12 software component information
13 mapping setting
14 drawing object information
15, 16 setting unit
21 output device
22 input device
40, 40B virtual space
41, 42 object
43 θ axis
44 Z axis
45 degree of relevance
46 r axis
50 user's viewpoint
410 lower virtual space
411, 412 object
413 θ axis
414 Z axis

The invention claimed is:

1. A software analysis support system that supports analysis of a structure of software that including software components, the system comprising at least one computer, wherein the computer is configured to:
  acquire software component information indicating a relationship between the software components and an attribute of each of the software components;
  acquire display element setting information in which a first display element corresponding to the attribute of each of the software components and a second display element corresponding to the relationship between the software components are set, the display element setting information being editable; and
  arrange each of the first display element and the second display element at a predetermined position in a virtual space in which a relationship between respective software components is displayed on a basis of a plurality of predetermined attributes selected in advance among attributes of the respective software components, wherein
  the virtual space is formed as a cylindrical space,
  a first attribute of the plurality of predetermined attributes is assigned in a circumferential direction of the cylindrical space, and
  a second attribute of the plurality of predetermined attributes is assigned in an axial direction of the cylindrical space.

2. The software analysis support system according to claim 1, wherein the plurality of predetermined attributes includes directory information of each of the software components.

3. The software analysis support system according to claim 2, wherein the plurality of predetermined attributes includes a hierarchical structure to which each software component belongs.

4. The software analysis support system according to claim 3, wherein the software component information can be set by a user via a first setting unit.

5. The software analysis support system according to claim 4, wherein the display element setting information is settable by a user via a second setting unit.

6. The software analysis support system according to claim 1, wherein a third attribute of the plurality of predetermined attributes is assigned in a radial direction of the cylindrical space.

7. The software analysis support system according to claim 1, wherein the virtual space is generated for each piece of software, and a degree of relevance between pieces of software corresponding to the virtual space is displayed.

8. The software analysis support system according to claim 1, wherein a viewpoint of the user is disposed at a predetermined position in the virtual space, and the user is allowed to visually recognize the first display element and the second display element displayed in the virtual space from the predetermined position.

9. A computer program product comprising a computer program and a computer to function as a software analysis support system that supports analysis of a structure of software which including software components, the computer program causing the computer to execute a process comprising:

acquiring software component information indicating a relationship between the software components and an attribute of each of software components;

acquiring display element setting information in which a first display element corresponding to the attribute of each of the software components and a second display element corresponding to the relationship between the software components are set, the display element setting information being editable; and arranging each of the first display element and the second display element at a predetermined position in a virtual space in which a relationship between respective software components is displayed on a basis of a plurality of predetermined attributes selected in advance among attributes of the respective software components, wherein the virtual space is formed as a cylindrical space, a first attribute of the plurality of predetermined attributes is assigned in a circumferential direction of the cylindrical space, and a second attribute of the plurality of predetermined attributes is assigned in an axial direction of the cylindrical space.

\* \* \* \* \*